(12) United States Patent
Karaila (10) Patent No.: US 11,608,029 B2
(45) Date of Patent: Mar. 21, 2023

(54) MICROPHONE-BASED VEHICLE PASSENGER LOCATOR AND IDENTIFIER (71) Applicant: Volvo Car Corporation, Gothenburg (SE)

(72) Inventor: Ville Karaila, San Jose, CA (US)

(73) Assignee: Volvo Car Corporation, Gothenburg (SE)

( * ) Notice: Subject to any disclaimer, the term of this patent is extended or adjusted under 35 U.S.C. 154(b) by 337 days.

(21) Appl. No.: 16/855,014

(22) Filed: Apr. 22, 2020

(65) Prior Publication Data
US 2020/0339068 A1 Oct. 29, 2020

Related U.S. Application Data (60) Provisional application No. 62/837,421, filed on Apr. 23, 2019.

(51) Int. Cl.
| | |
|---|---|
| *B60R 25/31* | (2013.01) |
| *B60R 25/25* | (2013.01) |
| *B60R 25/104* | (2013.01) |
| *G06F 21/32* | (2013.01) |
| *G06F 3/16* | (2006.01) |
| *H04W 4/40* | (2018.01) |
| *B60R 11/02* | (2006.01) |
| *B60R 25/10* | (2013.01) |

(52) U.S. Cl.
CPC ........ *B60R 25/257* (2013.01); *B60R 11/0247* (2013.01); *B60R 25/104* (2013.01); *B60R 25/31* (2013.01); *G06F 3/167* (2013.01); *G06F 21/32* (2013.01); *H04W 4/40* (2018.02); *B60R 2025/1013* (2013.01)

(58) Field of Classification Search
CPC . B60R 25/257; B60R 11/0247; B60R 25/104; B60R 25/31; B60R 2025/1013; H04W 4/40; G06F 3/167; G06F 21/32
See application file for complete search history.

(56) References Cited

U.S. PATENT DOCUMENTS

| | | |
|---|---|---|
| 8,676,427 B1 | 3/2014 | Ferguson et al. |
| 9,429,947 B1 | 8/2016 | Wengreen et al. |
| 9,720,410 B2 | 8/2017 | Fairfield et al. |
| 9,836,057 B2 | 12/2017 | Fairfield et al. |
| 10,088,846 B2 | 10/2018 | Gao et al. |

(Continued)

*Primary Examiner* — Nay Tun
(74) *Attorney, Agent, or Firm* — Clements Bernard Walker; Christopher L. Bernard (57) ABSTRACT A vehicle passenger locator and identifier system and method is provided herein. Once a vehicle is within a certain vicinity of an intended passenger via conventional mobile device geolocation or geofencing, and/or via a conventional camera-based technology, a plurality of microphones listen for the passenger to utter a predetermined word or phrase. Optionally, this predetermined word or phrase has been uttered to a mobile application used to summon the vehicle such that an accurate voice comparison can be made by the vehicle. Alternatively, the same or a different mobile device can be used to emit an auditory beacon that is detected by the vehicle. Once this word, phrase, or auditory beacon is detected, the passenger can be triangulated, located, identified, and even authorized for pickup. All of this is carried out via an onboard vehicle processor and software and/or a processor and software residing in the cloud.

20 Claims, 6 Drawing Sheets (56) References Cited

U.S. PATENT DOCUMENTS

| | | | | |
|---|---|---|---|---|
| 10,580,291 | B1* | 3/2020 | Rothenberg | B60Q 5/00 |
| 2007/0280486 | A1* | 12/2007 | Buck | H04R 27/00 |
| | | | | 381/92 |
| 2009/0125311 | A1* | 5/2009 | Haulick | B60R 16/0373 |
| | | | | 704/275 |
| 2013/0141576 | A1* | 6/2013 | Lord | G08G 1/096716 |
| | | | | 348/148 |
| 2014/0306799 | A1* | 10/2014 | Ricci | H04W 12/088 |
| | | | | 340/5.83 |
| 2016/0217689 | A1* | 7/2016 | Young | G08G 1/0965 |
| 2018/0013211 | A1* | 1/2018 | Ricci | G05D 1/0011 |
| 2018/0039917 | A1* | 2/2018 | Buttolo | B60W 60/00253 |
| 2018/0115851 | A1* | 4/2018 | Duong | G10L 25/84 |
| 2018/0201226 | A1* | 7/2018 | Falkson | B60R 25/257 |
| 2018/0208113 | A1* | 7/2018 | Haupts | B60W 30/08 |
| 2019/0318159 | A1* | 10/2019 | Blanc-Paques | G06Q 50/30 |
| 2019/0348065 | A1* | 11/2019 | Talwar | G10L 25/78 |
| 2020/0047687 | A1* | 2/2020 | Camhi | G10L 15/22 |
| 2020/0075006 | A1* | 3/2020 | Chen | G10L 13/00 |
| 2020/0166366 | A1* | 5/2020 | Herman | G06V 40/10 |
| 2021/0174793 | A1* | 6/2021 | Grgac | B60R 25/24 |

* cited by examiner

MICROPHONE-BASED VEHICLE PASSENGER LOCATOR AND IDENTIFIER

CROSS-REFERENCE TO RELATED APPLICATION

The present disclosure claims the benefit of priority of U.S. Provisional Patent Application No. 62/837,421, filed on Apr. 23, 2019, and entitled "MICROPHONE-BASED VEHICLE PASSENGER LOCATOR AND IDENTIFIER," the contents of which are incorporated in full by reference herein.

TECHNICAL FIELD

The present disclosure relates generally to the automotive field. More particularly, the present disclosure relates to the autonomous driving (AD) and advanced driver assistance system (ADAS) fields. The present disclosure provides a microphone-based vehicle passenger locator and identifier system and method.

BACKGROUND

As the AD/ADAS fields develop and mature, it is desirable that a passenger be permitted to summon a vehicle to a geographical location for pick-up using a mobile device executing an appropriate mobile application (app), for example. This is especially important in ride-sharing and taxi situations and the like. In such cases, the passenger might use the mobile app to summon the vehicle to his or her work at a designated time. The vehicle would then autonomously travel to this geographical location near the designated time and stop in the proximity of the passenger. Stopping accurately in the proximity of the passenger represents a significant challenge, particularly in urban environments. Further, the vehicle must ensure that the correct passenger is being granted access and picked up.

Of course, a variety of radar, lidar, and camera-based systems and methods have been developed to make sure that the vehicle travels on a drivable surface and does not impact another vehicle, a pedestrian, a cyclist, etc. In addition, a variety of systems and methods have been developed to tag and utilize the exact position of the passenger through the geolocation of his or her mobile device and/or using one or more side vehicle cameras to locate and identify the passenger as he or she is waiting for the vehicle. These camera-based systems and methods may utilize appropriate segmentation, annotation, and artificial intelligence (AI) algorithms and the like.

Disadvantageously, related to the camera-based systems and methods, cameras are relatively expensive and do not work well when dirty or under inclement weather or low light conditions. Further, relatively complex processing is required to locate and identify a passenger that is standing amongst a crowd of people, for example, even if the passenger has previously been identified (such as through a mobile device photo) or offers a predetermined gesture (such as a wave). Thus, a simpler and more reliable option for locating and identifying an intended AD/ADAS passenger is still needed in the art.

The above-described background relating to ride-sharing and taxi situations is merely intended to provide a contextual overview of some current issues related to the present disclosure and is not intended to be exhaustive. Other contextual information may become apparent to those of ordinary skill in the art upon review of the following description of exemplary embodiments.

SUMMARY

Accordingly, the present disclosure provides a simple and reliable microphone-based vehicle passenger locator and identifier system and method. Once an AD/ADAS vehicle is within a certain vicinity of an intended passenger via conventional mobile device geolocation, geofencing, and/or the like, and/or via a conventional camera-based technology, a plurality of microphones essentially listen for the passenger to utter a predetermined word or phrase, like "Hello, Volvo!" Optionally, this predetermined word or phrase has been uttered to the mobile app or the like used to summon the vehicle such that an accurate voice comparison can then be made by the vehicle. Alternatively, the same or a different mobile device can be used to emit an auditory beacon that is unique and specifically detected by the vehicle. Once this word, phrase, or auditory beacon is detected, the passenger can be precisely triangulated, located, identified, and even authorized for pickup. All of this is carried out via an onboard vehicle processor and software and/or a processor and software residing in the cloud.

In one exemplary embodiment, the present disclosure provides a vehicle passenger locator and identifier system, including: one or more microphones adapted to be coupled to an exterior surface of a vehicle and receive an auditory signal from an individual positioned outside of and adjacent to the vehicle; and memory comprising location and identification instructions that, when executed, cause a processor to receive the auditory signal from the microphone and determine a location and an identification of the individual from the auditory signal based on a characteristic of the auditory signal. The vehicle passenger locator and identifier system also includes memory comprising vehicle control instructions that, when executed, cause the processor to decelerate and stop the vehicle based on the determined location of the individual. Optionally, the one or more microphones include a single directional microphone adapted to receive the auditory signal, and wherein the location and identification instructions are operable for determining the location of the individual by evaluating one or more of an intensity and a shift of the auditory signal. Alternatively, the one or more microphones include a pair of microphones adapted to receive the auditory signal, and wherein the location and identification instructions are operable for determining the location of the individual by triangulating the auditory signal. The location and identification instructions are further operable for determining the identification of the individual by comparing the auditory signal to an auditory one of stored in a memory in communication with the processor and previously received from the individual and stored in the memory in communication with the processor. The location and identification instructions are still further operable for, based on determining the identification of the individual, authenticating the individual and allowing the authenticated individual to actuate the vehicle using one or more voice commands. The location and identification instructions are still further operable for deploying a security measure in the event that the individual cannot be identified from the auditory signal.

In another exemplary embodiment, the present disclosure provides an autonomous driving vehicle, including: a vehicle passenger locator and identifier system, including: one or more microphones adapted to be coupled to an exterior surface of a vehicle and receive an auditory signal from an individual positioned outside of and adjacent to the vehicle; and memory comprising location and identification instructions that, when executed, cause a processor to receive the auditory signal from the microphone and determine a location and an identification of the individual from the auditory signal based on a characteristic of the auditory signal; and memory comprising vehicle control instructions that, when executed, cause the processor to decelerate and stop the vehicle based on the determined location of the individual. Optionally, the one or more microphones include a single directional microphone adapted to receive the auditory signal, and wherein the location and identification instructions are operable for determining the location of the individual by evaluating one or more of an intensity and a shift of the auditory signal. Alternatively, the one or more microphones include a pair of microphones adapted to receive the auditory signal, and wherein the location and identification instructions are operable for determining the location of the individual by triangulating the auditory signal. The location and identification instructions are also operable for determining the identification of the individual by comparing the auditory signal to an auditory signal of stored in a memory in communication with the processor and previously received from the individual and stored in the memory in communication with the processor. The location and identification instructions are further operable for, based on determining the identification of the individual, authenticating the individual and allowing the authenticated individual to actuate the vehicle using one or more voice commands. The location and identification instructions are still further operable for deploying a security measure in the event that the individual cannot be identified from the auditory signal.

In a further exemplary embodiment, the present disclosure provides a computer readable-medium having instructions stored thereon and executed by a processor to locate and identify a vehicle passenger outside of and adjacent to a vehicle in accordance with the following steps: receiving an auditory signal from the individual using one or more microphones coupled to an exterior surface of the vehicle; and determining a location and an identification of the individual from the received auditory signal based on a characteristic of the auditory signal using location and identification instructions stored in the memory and executed by the processor. The steps also include decelerating and stopping the vehicle based on the determined location of the individual using vehicle control instructions stored in the memory and executed by the processor. Optionally, the one or more microphones include a single directional microphone adapted to receive the auditory signal, and wherein the location and identification instructions are operable for determining the location of the individual by evaluating one or more of an intensity and a shift of the auditory signal. Alternatively, the one or more microphones include a pair of microphones adapted to receive the auditory signal, and wherein the location and identification instructions are operable for determining the location of the individual by triangulating the auditory signal. The steps further include determining the identification of the individual by comparing the auditory signal to an auditory signal one of stored in an external memory in communication with the processor and previously received from the individual and stored in the memory in communication with the processor using the location and identification instructions. The steps still further include, based on determining the identification of the individual, authenticating the individual and allowing the authenticated individual to actuate the vehicle using one or more voice commands using the location and identification instructions. The steps still further include deploying a security measure in the event that the individual cannot be identified from the auditory signal using the location and identification instructions.

BRIEF DESCRIPTION OF THE DRAWINGS

The present disclosure is illustrated and described herein with reference to the various drawings, in which like reference numbers are used to denote like system components/method steps, as appropriate, and in which:

FIG. 5 is a block diagram of a server which may be used in the cloud-based system of FIG. 4 or the like; and FIG. 6 is a block diagram of a user device which may be used in the cloud-based system of FIG. 4 or the like.

DESCRIPTION OF EMBODIMENTS

Again, the present disclosure provides a simple and reliable microphone-based vehicle passenger locator and identifier system and method. Once an AD/ADAS vehicle is within a certain vicinity of an intended passenger via conventional mobile device geolocation, geofencing, and/or the like, and/or via a conventional camera-based technology, a plurality of microphones essentially listen for the passenger to utter a predetermined word or phrase, like "Hello, Volvo!" Optionally, this predetermined word or phrase has been uttered to the mobile app or the like used to summon the vehicle such that an accurate voice comparison can then be made by the vehicle. Alternatively, the same or a different mobile device can be used to emit an auditory beacon that is unique and specifically detected by the vehicle. Once this word, phrase, or auditory beacon is detected, the passenger can be precisely triangulated, located, identified, and even authorized for pickup. All of this is carried out via an onboard vehicle processor and software and/or a processor and software residing in the cloud.

Advantageously, the system and method of the present disclosure, within close range, can triangulate, locate, identify, and authorize a passenger, or a plurality of passengers, among a group of people in the vicinity using relatively inexpensive and reliable components and software algorithms. This can lead to important pendant functionalities, such as the ability to detect or be informed of the presence of an unauthorized and undesired person (i.e., a threat) in the presence of the passenger upon the arrival of the vehicle. Protective vehicle measures can then be taken and such a threat can be communicated to proper authorities through the cloud, etc. Further, passenger voices can be recorded and stored in the cloud for later triangulation, location, identification, and authorization activities. Still further, after a passenger is authenticated, voice commands can be further received to command the operation of the AD/ADAS vehicle, as is done conventionally. In this sense, the voice recognition of the present disclosure acts as an initial, master authentication as the AD/ADAS vehicle pulls up.

Figure 1:
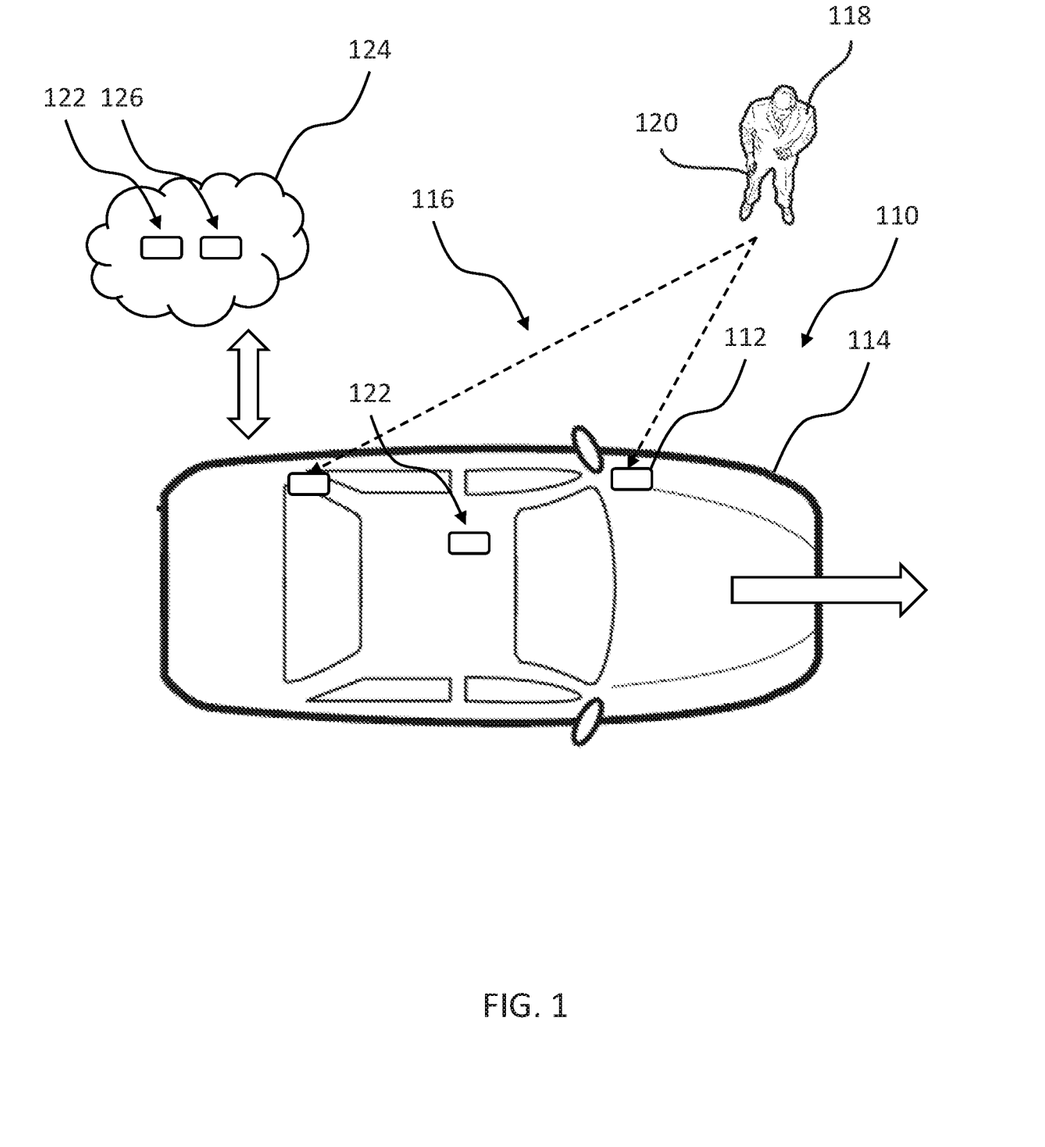
FIG. 1 is a schematic diagram illustrating one exemplary embodiment of the microphone-based vehicle passenger locator and identifier system of the present disclosure in a first operating state, highlighting the functionality of the corresponding components.
Figure 2:
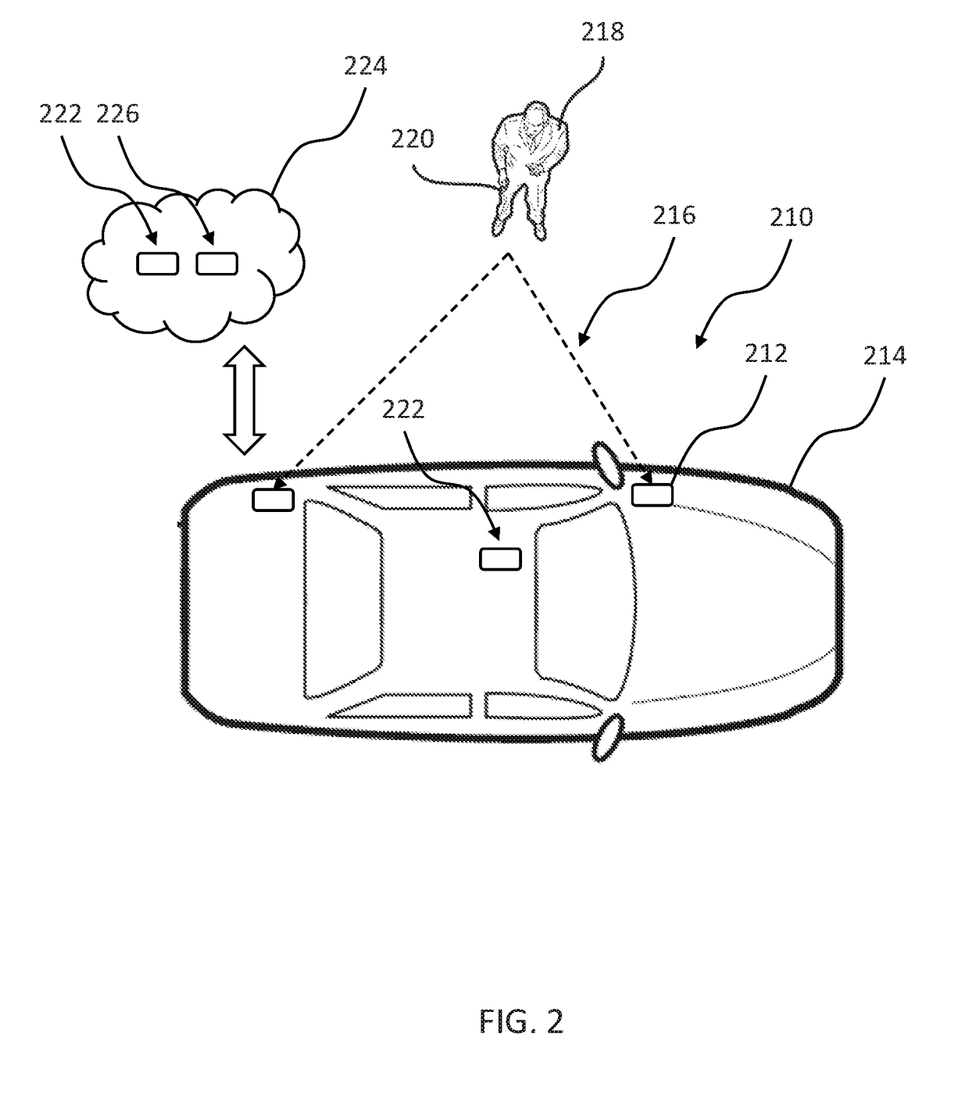
FIG. 2 is another schematic diagram illustrating one exemplary embodiment of the microphone-based vehicle passenger locator and identifier system of the present disclosure in a second operating state, highlighting the functionality of the corresponding components.

Referring now specifically to FIGS. 1 and 2, in one exemplary embodiment, the vehicle passenger locator and identifier system 110,210 includes a pair of microphones 112,212 associated with and coupled to the vehicle 114,214. These microphones 112,212 can be affixed to the exterior surface of the vehicle, disposed in the door sills (not illustrated) of the vehicle 114,214, etc., such that they have "line of hearing" visibility to the potential passenger 118, 218 and/or his or her mobile device 120,220. These microphones 112,212 are operable for picking up an auditory signal 116,216 emitted by the potential passenger 118,218, either verbally or through his or her mobile device 120,220, as the vehicle 114,214 approaches the potential passenger 118,218. Here, it is likely that the potential passenger 118,218 has requested that the vehicle 114,214 come to his or her geographical location at a predetermined time using a mobile app executed on his or her mobile device 120,220. As the vehicle 114,214 approaches the potential passenger 118,218, initially guided by conventional global positioning satellite (GPS) guidance, geofencing, and/or geolocation or the like, the vehicle 114,214 slows down and "listens" for the auditory signal 116,216, which may be a random word or phrase, a predetermined word or phrase, or a predetermined auditory alert. Once detected, the auditory signal 116,216 acts as a homing beacon and location/triangulation is performed by the location and identification software module 122,222 resident in the vehicle 114,214 and/or in the cloud 124,224, informing an associated vehicle control software module 126,226 (resident in the cloud 124,224) related to when/where the vehicle 114,214 should decelerate and stop to be in proximity of/adjacent to the potential passenger 118,218 with a predetermined degree of accuracy.

As used herein, "microphone" can refer to any sonic probe, including a particle velocity probe and/or the like. As will be readily apparent to those of ordinary skill in the art there are many conventional sonic location and triangulation methodologies, both passive and active, all of which can be implemented here. Acoustic source localization is the act of locating a sound source given measurements of the sound field. For example, the present disclosure may utilize a conventional time difference of arrival (TDOA) technique, which is enabled by the pair of spatially-separated microphones 112,212 provided herein. In an acoustic particle velocity technique, a particle velocity probe is used. The particle velocity is a vector and thus contains directional information. The most common convention technique to obtain the source direction is using the TDOA method. This method can be used with pressure microphones as well as with particle velocity probes. With a sensor or microphone array including at least two probes, it is possible to obtain the source direction using the cross-correlation function between the signal of each probe. Likewise, triangulation is the process of determining the location of a point by measuring angles to it from known points at either end of a fixed baseline, rather than measuring distances to the point directly (trilateration). The point can then be fixed as the third point of a triangle with one known side and two known angles. For acoustic localization, this means that if the source direction is measured at two or more locations in space, it is possible to triangulate its location. Steered response power (SRP) techniques are a class of indirect acoustic source localization methods. Instead of estimating a set of TDOAs between pairs of microphones and combining the acquired estimates to find the source location, indirect methods search for a candidate source location over a grid of spatial points. It should be noted that multiple microphone localization embodiments are preferred herein due to their relatively low cost and processing simplicity, however, a single microphone can be used with more expensive and complex localization methodologies, especially since the potential passengers approximate location will generally be known.

Again, the system 110,210 of the present disclosure, within close range, can triangulate, locate, identify, and authorize the potential passenger 118,218, or a plurality of potential passengers 118,218, among a group of people in the vicinity using relatively inexpensive and reliable components and software algorithms. This can lead to important pendant functionalities, such as the ability to detect or be informed of the presence of an unauthorized and undesired person (i.e., a threat) in the presence of the potential passenger 118,218 upon the arrival of the vehicle 114,214. Protective vehicle measures can then be taken and such a threat can be communicated to proper authorities through the cloud, to the passenger, etc. Further, passenger voices can be recorded and stored in the cloud for later triangulation, location, identification, and authorization activities. Still further, after a potential passenger 118,218 is authenticated, voice commands can be further received to command the operation of the AD/ADAS vehicle 114,214, as is done conventionally. In this sense, the voice recognition of the present disclosure acts as an initial, master authentication as the AD/ADAS vehicle 114,214 pulls up. It will be readily apparent to those of ordinary skill in the at that any suitable voice or sound recognition technology may be utilized herein. For example, the potential passenger may utter a predetermined password, or an encoded audio chirp may be utilized, or any personalized or unique sound can be used.

Figure 3:
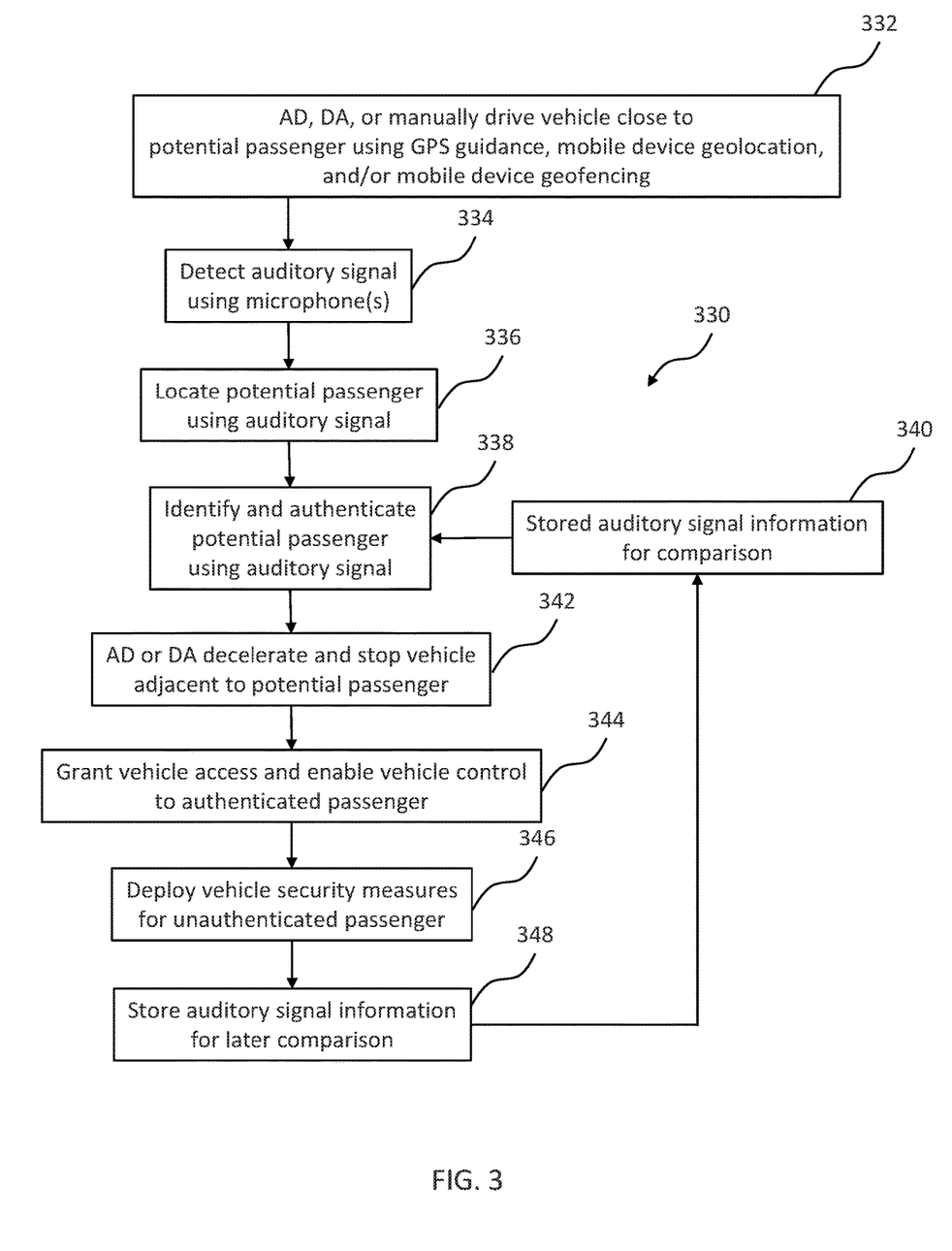
FIG. 3 is a flowchart illustrating one exemplary embodiment of the microphone-based vehicle passenger locator and identifier method of the present disclosure.

Referring now specifically to FIG. 3, in another exemplary embodiment, the vehicle passenger locator and identifier method 330 includes first AD, ADAS, or manually driving the vehicle 114,214 (FIGS. 1 and 2) close to the intended passenger 118,218 (FIGS. 1 and 2), again, using GPS guidance, mobile device geolocation, and/or mobile device geofencing, for example. (Step 332). Basically, the vehicle 114,214 is preferably brought to within a predetermined threshold of the potential passenger 118,218 such that the microphone(s) 112,212 (FIGS. 1 and 2) can detect the auditory signal 116,216 (FIGS. 1 and 2). The auditory signal 116,216 is then detected by the microphone(s) and processed by the processor 122,222 (FIGS. 1 and 2). (Step 34). Next, the location and identification module 122,222 is used to acoustically locate or triangulate the potential passenger 118,218 via processing of the auditory signal 116,216. (Step 36). Again, this acoustic location or triangulation can make use of any conventional or novel methodology, well known to those of ordinary skill in the art. For example, the angle to the potential passenger 118,218 can be calculated using a time difference to microphone "hits." Optionally, the located passenger 118,218 is also identified and/or authenticated via processing of the auditory signal 116,216. (Step 38). For example, the auditory signal 116216 can be compared to a previously-stored auditory signal 116,216 resident in the vehicle 114,214 and/or in the cloud 124,224 (FIGS. 1 and 2) and, optionally, obtained from the potential passenger 118, 218 using the mobile device 120,220 (FIGS. 1 and 2). (Step 40). Exemplary voice/sound recognition techniques include, but are not limited to, typical voice or sound recognition, detection of a predetermined password, detection of a predetermined audio chirp, etc. Next, the vehicle control module 122,222 is used to decelerate and stop the vehicle adjacent to the intended passenger 118,218. (Step 42). Finally, as alluded to above, AD/ADAS vehicle access can be granted to and AD/ADAS vehicle control can be enabled for an authenticated passenger 118,218 (step 44), vehicle security measures can be deployed for an unauthenticated passenger 118,218 (step 46), auditory signal information can be stored for later comparison purposes (step 48), etc. For example, the vehicle 118,218 may only be unlocked for an identified and authenticated passenger upon arrival.

It is to be recognized that, depending on the example, certain aspects or actions of any of the techniques described herein can be performed in a different sequence, may be added, merged, or left out altogether (e.g., not all described aspects or actions are necessary for the practice of the techniques). Moreover, in certain examples, aspects or actions may be performed concurrently, e.g., through multi-threaded processing, interrupt processing, or via multiple processors, rather than sequentially. All method steps are executed as coded instructions stored in a memory and executed by a processor, where it is understood that the memory may be a singular memory or plural separate memories executed by a singular processor or plural separate processors, as appropriate.

Figure 4:
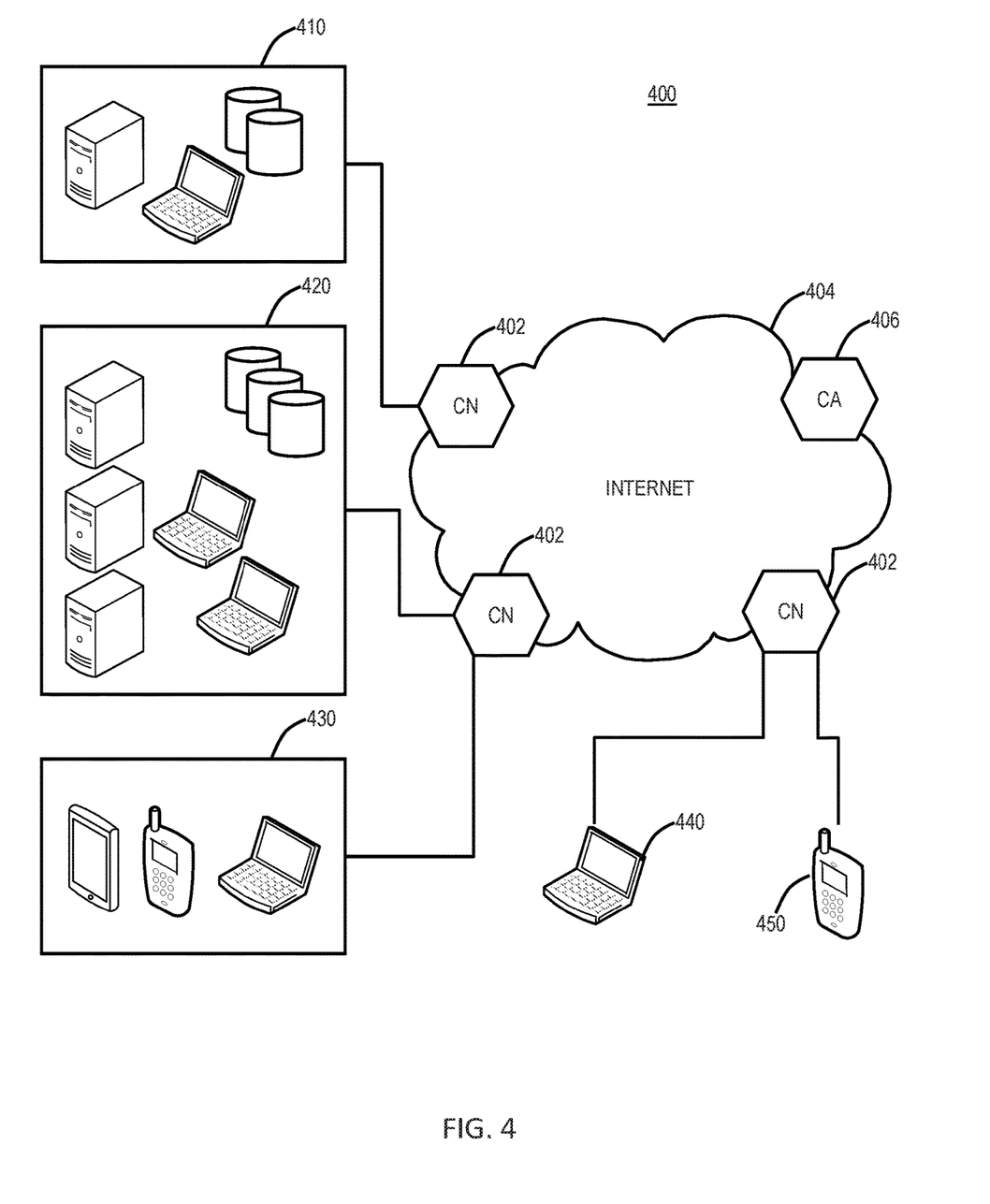
FIG. 4 is a network diagram of a cloud-based system for implementing the various cloud-based services of the present disclosure.
Figure 5:
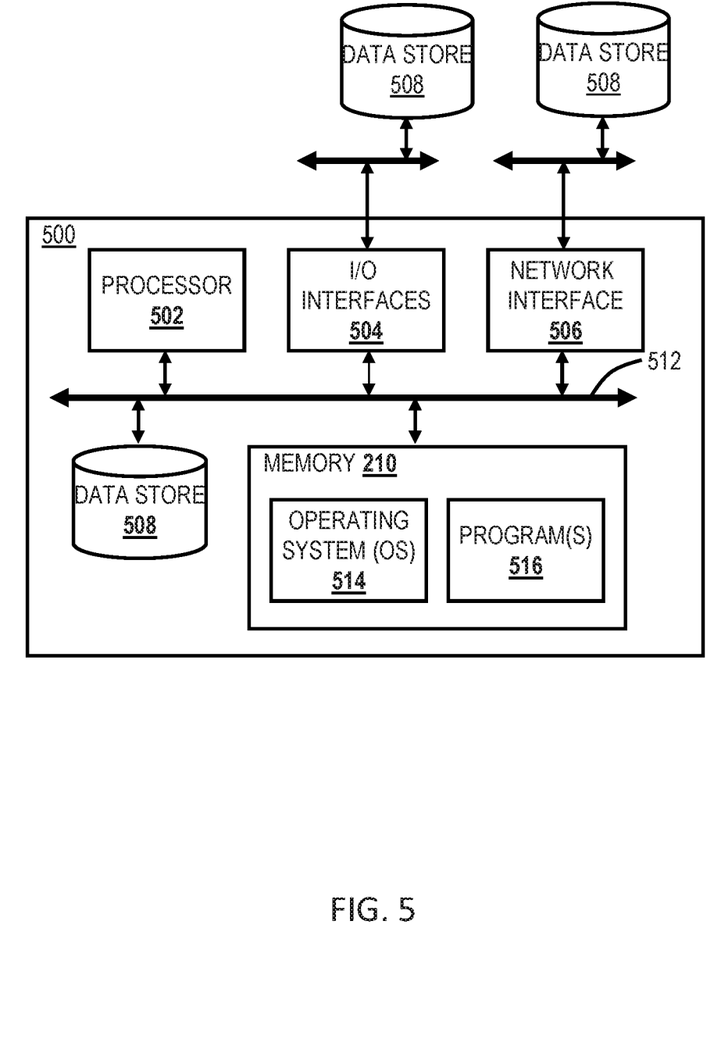

FIG. 4 is a network diagram of a cloud-based system 400 for implementing various cloud-based services. The cloud-based system 400 includes one or more cloud nodes (CNs) 402 communicatively coupled to the Internet 404 or the like. The cloud nodes 402 may be implemented as a server 500 (as illustrated in FIG. 5) or the like and can be geographically diverse from one another, such as located at various data centers around the country or globe. Further, the cloud-based system 400 can include one or more central authority (CA) nodes 406, which similarly can be implemented as the server 500 and be connected to the CNs 402. For illustration purposes, the cloud-based system 400 can connect to a regional office 410, headquarters 420, various employee's homes 430, laptops/desktops 440, and mobile devices 450, each of which can be communicatively coupled to one of the CNs 402. These locations 410, 420, and 430, and devices 440 and 450 are shown for illustrative purposes, and those skilled in the art will recognize there are various access scenarios to the cloud-based system 400, all of which are contemplated herein. The devices 440 and 450 can be so-called road warriors, i.e., users off-site, on-the-road, etc. The cloud-based system 400 can be a private cloud, a public cloud, a combination of a private cloud and a public cloud (hybrid cloud), or the like.

Again, the cloud-based system 400 can provide any functionality through services such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 410, 420, and 430 and devices 440 and 450. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 400 is replacing the conventional deployment model. The cloud-based system 400 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 400 is illustrated herein as one example embodiment of a cloud-based system, and those of ordinary skill in the art will recognize the systems and methods described herein are not necessarily limited thereby.

FIG. 5 is a block diagram of a server 500, which may be used in the cloud-based system 400 (FIG. 4), in other systems, or standalone. For example, the CNs 402 (FIG. 4) and the central authority nodes 406 (FIG. 4) may be formed as one or more of the servers 500. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 5 depicts the server 500 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 may be, for example, but not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chipset), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate on a network, such as the Internet 404 (FIG. 4). The network interface 506 may include, for example, an Ethernet card or adapter (e.g., 10 BaseT, Fast Ethernet, Gigabit Ethernet, or 10 GbE) or a Wireless Local Area Network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500, such as, for example, an internal hard drive connected to the local interface 512 in the server 500. Additionally, in another embodiment, the data store 508 may be located external to the server 500 such as, for example, an external hard drive connected to the I/O interfaces 504 (e.g., a SCSI or USB connection). In a further embodiment, the data store 508 may be connected to the server 500 through a network, such as, for example, a network-attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 6:
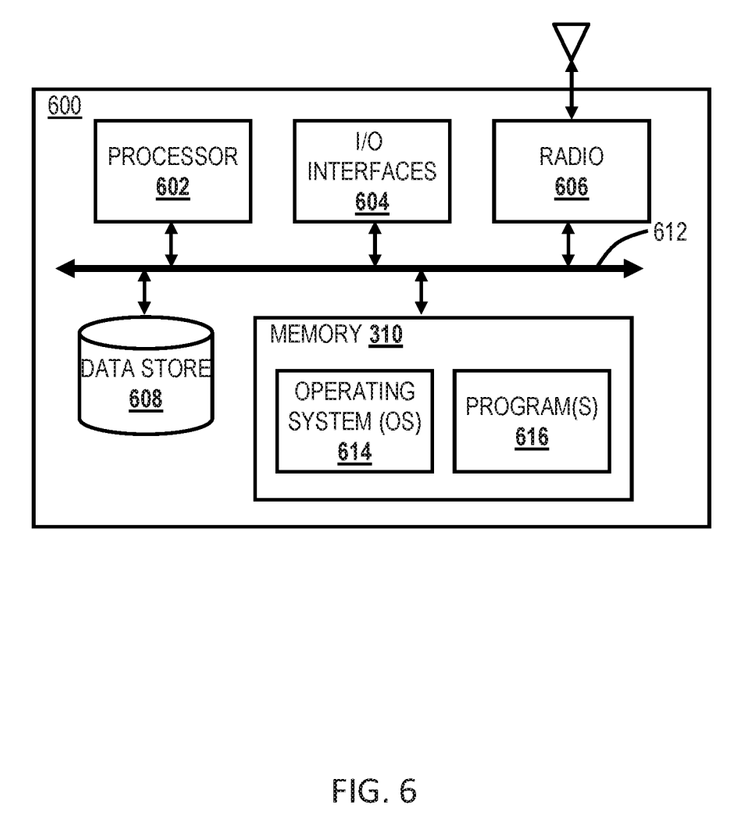

FIG. 6 is a block diagram of a user device 600, which may be used in the cloud-based system 400 (FIG. 4) or the like. Again, the user device 600 can be a smartphone, a tablet, a smartwatch, an Internet of Things (IoT) device, a laptop, a virtual reality (VR) headset, etc. The user device 600 can be a digital device that, in terms of hardware architecture, generally includes a processor 602, I/O interfaces 604, a radio 606, a data store 608, and memory 610. It should be appreciated by those of ordinary skill in the art that FIG. 6 depicts the user device 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but is not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 can be any custom made or commercially available processor, a CPU, an auxiliary processor among several processors associated with the user device 600, a semiconductor-based microprocessor (in the form of a microchip or chipset), or generally any device for executing software instructions. When the user device 600 is in operation, the processor 602 is configured to execute software stored within the memory 610, to communicate data to and from the memory 610, and to generally control operations of the user device 600 pursuant to the software instructions. In an embodiment, the processor 602 may include a mobile optimized processor such as optimized for power consumption and mobile applications. The I/O interfaces 604 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 606 enables wireless communication to an external access device or network. Any number of suitable wireless data communication protocols, techniques, or methodologies can be supported by the radio 606, including any protocols for wireless communication. The data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media.

Again, the memory 610 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 610 may incorporate electronic, magnetic, optical, and/or other types of storage media. Note that the memory 610 may have a distributed architecture, where various components are situated remotely from one another, but can be accessed by the processor 602. The software in memory 610 can include one or more software programs, each of which includes an ordered listing of executable instructions for implementing logical functions. In the example of FIG. 6, the software in the memory 610 includes a suitable operating system 614 and programs 616. The operating system 614 essentially controls the execution of other computer programs and provides scheduling, input-output control, file and data management, memory management, and communication control and related services. The programs 616 may include various applications, add-ons, etc. configured to provide end user functionality with the user device 600. For example, example programs 616 may include, but not limited to, a web browser, social networking applications, streaming media applications, games, mapping and location applications, electronic mail applications, financial applications, and the like. In a typical example, the end-user typically uses one or more of the programs 616 along with a network such as the cloud-based system 400 (FIG. 4).

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A system, comprising:
a microphone coupled to an exterior surface of a vehicle that receives an auditory signal from an individual positioned outside of and adjacent to the vehicle;
memory comprising location and identification instructions that, when executed, cause a processor to receive the auditory signal from the microphone and determine a location and an identification of the individual from the auditory signal based on a characteristic of the auditory signal; and
the memory comprising vehicle control instructions that, when executed, cause the processor to decelerate and stop the vehicle based on the determined location of the individual comprising a determined location of a source of the auditory signal.

2. The system of claim 1, wherein the microphone comprises a single directional microphone adapted to receive the auditory signal, and wherein the location and identification instructions are configured to determine the location of the individual by evaluating one or more of an intensity and a shift of the auditory signal.

3. The system of claim 1, wherein the microphone comprises a pair of microphones adapted to receive the auditory signal, and wherein the location and identification instructions are configured to determine the location of the individual by triangulating the auditory signal.

4. The system of claim 1, wherein the location and identification instructions are configured to determine the identification of the individual by comparing the auditory signal to an auditory signal one of stored in a memory in communication with the processor and previously received from the individual and stored in the memory in communication with the processor.

5. The system of claim 4, wherein the location and identification instructions are further configured to, based on determining the identification of the individual, authenticate the individual and allow the authenticated individual to actuate the vehicle using one or more voice commands.

6. The system of claim 1, wherein the location and identification instructions are further configured to deploy a security measure in the event that the individual cannot be identified from the auditory signal.

7. The system of claim 6, wherein the security measure comprises communicating a threat posed by the individual that cannot be identified from the auditory signal to authorities through a cloud network.

8. A vehicle, comprising:
a vehicle passenger locator and identifier system, comprising:
a microphone coupled to an exterior surface of a vehicle that receives an auditory signal from an individual positioned outside of and adjacent to the vehicle; and
memory comprising location and identification instructions that, when executed, cause a processor to receive the auditory signal from the microphone and determine a location and an identification of the individual from the auditory signal based on a characteristic of the auditory signal; and
the memory comprising vehicle control instructions that, when executed, cause the processor to decelerate and stop the vehicle based on the determined location of the individual comprising a determined location of a source of the auditory signal.

9. The vehicle of claim 8, wherein the microphone comprises a single directional microphone adapted to receive the auditory signal, and wherein the location and identification instructions are configured to determine the location of the individual by evaluating one or more of an intensity and a shift of the auditory signal.

10. The vehicle of claim 8, wherein the microphone comprises a pair of microphones adapted to receive the auditory signal, and wherein the location and identification instructions are configured to determine the location of the individual by triangulating the auditory signal.

11. The vehicle of claim 8, wherein the location and identification instructions are configured to determine the identification of the individual by comparing the auditory signal to an auditory signal one of stored in a memory in communication with the processor and previously received from the individual and stored in the memory in communication with the processor.

12. The vehicle of claim 11, wherein the location and identification instructions are further configured to, based on determining the identification of the individual, authenticate the individual and allow the authenticated individual to actuate the vehicle using one or more voice commands.

13. The vehicle of claim 8, wherein the location and identification instructions are further configured to deploy a security measure in the event that the individual cannot be identified from the auditory signal.

14. A non-transitory computer readable-medium having instructions stored in a memory and executed by a processor in accordance with the following steps:
   receiving an auditory signal from an individual using a microphone coupled to an exterior surface of a vehicle;
   determining a location and an identification of the individual from the received auditory signal based on a characteristic of the auditory signal using location and identification instructions stored in the memory and executed by the processor; and
   decelerating and stopping the vehicle based on the determined location of the individual comprising a determined location of a source of the auditory signal using vehicle control instructions stored in the memory and executed by the processor.

15. The non-transitory computer-readable medium of claim 14, wherein the microphone comprises a single directional microphone adapted to receive the auditory signal, and wherein the location and identification instructions are configured to determine the location of the individual by evaluating one or more of an intensity and a shift of the auditory signal.

16. The non-transitory computer-readable medium of claim 14, wherein the microphone comprises a pair of microphones adapted to receive the auditory signal, and wherein the location and identification instructions are configured to determine the location of the individual by triangulating the auditory signal.

17. The non-transitory computer-readable medium of claim 14, further comprising:
   determining the identification of the individual by comparing the auditory signal to an auditory one of stored in an external memory in communication with the processor and previously received from the individual and stored in the memory in communication with the processor using the location and identification instructions.

18. The non-transitory computer-readable medium of claim 17, further comprising:
   based on determining the identification of the individual, authenticating the individual and allowing the authenticated individual to actuate the vehicle using one or more voice commands using the location and identification instructions.

19. The non-transitory computer-readable medium of claim 14, further comprising:
   deploying a security measure in the event that the individual cannot be identified from the auditory signal using the location and identification instructions.

20. The non-transitory computer-readable medium of claim 19, wherein the security measure comprises communicating a threat posed by the individual that cannot be identified from the auditory signal to authorities through a cloud network.

* * * * *